US010744819B2

(12) United States Patent
Cestari et al.

(10) Patent No.: US 10,744,819 B2
(45) Date of Patent: Aug. 18, 2020

(54) WHEELS FOR DISPLACEMENT TRUCKS

(71) Applicant: VALE S.A., Rio de Janeiro (RJ) (BR)

(72) Inventors: José Siqueira Cestari, Serra (BR); Marcelo Rocha Gava, Cariacica (BR); André Luiz Capua De Lima, Vila Velha (BR)

(73) Assignee: VALE S.A., Rio de Janeiro (BR)

( * ) Notice: Subject to any disclaimer, the term of this patent is extended or adjusted under 35 U.S.C. 154(b) by 0 days.

(21) Appl. No.: 16/083,800

(22) PCT Filed: Mar. 8, 2017

(86) PCT No.: PCT/BR2017/000029
§ 371 (c)(1),
(2) Date: Sep. 10, 2018

(87) PCT Pub. No.: WO2017/152247
PCT Pub. Date: Sep. 14, 2017

(65) Prior Publication Data
US 2019/0084348 A1    Mar. 21, 2019

(30) Foreign Application Priority Data
Mar. 10, 2016 (BR) .............................. 202016005359

(51) Int. Cl.
*B60B 17/00* (2006.01)
*B61F 13/00* (2006.01)

(52) U.S. Cl.
CPC ...... *B60B 17/0072* (2013.01); *B60B 17/0006* (2013.01); *B60B 17/0013* (2013.01); *B61F 13/00* (2013.01)

(58) Field of Classification Search
CPC . B60B 17/00; B60B 17/0006; B60B 17/0013; B60B 17/0055; B60B 17/0058; B60B 17/0065; B60B 17/0072
See application file for complete search history.

(56) References Cited

U.S. PATENT DOCUMENTS

| 16,724 | A | | 3/1857 | Evans | |
|---|---|---|---|---|---|
| 67,036 | A | * | 7/1867 | Forrest | B60B 17/0055 295/15 |
| 218,453 | A | * | 8/1879 | Rigby | B60B 17/0055 295/15 |
| 303,700 | A | * | 8/1884 | Broadbent | B60B 17/0055 295/15 |
| 1,267,350 | A | * | 5/1918 | Adams | B60B 17/0055 295/20 |
| 1,543,971 | A | * | 6/1925 | Abbott | B60B 17/0055 105/77 |

(Continued)

FOREIGN PATENT DOCUMENTS

CH          350317 A        11/1960

OTHER PUBLICATIONS

International Search Report and Written Opinion dated May 19, 2017 issued in International Application No. PCT/BR2017/000029.
(Continued)

*Primary Examiner* — Jason R Bellinger
(74) *Attorney, Agent, or Firm* — Arent Fox, LLP

(57) ABSTRACT

A wheel for a displacement truck having a wheel body and removable ribs is provided. The ribs are segmented into at least two parts to facilitate removal from the wheel body.

10 Claims, 2 Drawing Sheets

(56) References Cited

U.S. PATENT DOCUMENTS

| | | | |
|---|---|---|---|
| 1,782,285 A | | 11/1930 | Bourdon |
| 1,981,196 A | * | 11/1934 | Riblet ..................... F16H 7/18 |
| | | | 295/20 |
| 2,853,337 A | | 9/1958 | Boschi |
| 2,911,252 A | | 11/1959 | Templeton |
| 4,818,041 A | * | 4/1989 | Oertley ................ B62D 55/145 |
| | | | 295/20 |
| 5,183,306 A | | 2/1993 | Emilsson |
| 5,373,791 A | * | 12/1994 | Bach .................... A63H 17/262 |
| | | | 104/288 |
| 6,312,033 B1 | | 11/2001 | Engstler |
| 6,322,121 B1 | * | 11/2001 | French ................ B60B 17/0068 |
| | | | 104/242 |
| 2003/0037696 A1 | | 2/2003 | Forbes |
| 2007/0273168 A1 | | 11/2007 | Gedenk |
| 2010/0005935 A1 | | 1/2010 | Ross |

OTHER PUBLICATIONS

Second Written Opinion dated Mar. 28, 2018 issued in International Application No. PCT/BR2017/000029.

\* cited by examiner

WHEELS FOR DISPLACEMENT TRUCKS

CROSS-REFERENCE TO RELATED APPLICATIONS

This application is a 35 U.S.C. § 371 National Phase of PCT Application No. PCT/BR2017/000029 filed Mar. 8, 2017, which claims priority to Brazilian Application No. BR 202016005359-0 filed Mar. 10, 2016, the disclosures of each of which are hereby incorporated by reference in their entirety.

FIELD

This disclosure comprises a wheel for a displacement truck of port machinery and equipment which move on rails.

BACKGROUND

Displacement systems are used by port machinery and equipment which move on railroads. The displacement system of a machine is responsible for its movement. The mentioned displacement system is made of displacement trucks and their rocker arms. Displacement trucks are specifically fitted with wheelsets made of wheels and axles, supported by the truck box.

The wheelset is fully comprised by an axle and two displacement wheels, being both elements concentric to a same central axis of reference. The wheels are fixed to the longitudinal axle near the ends, each one cooperating with one of the axle ends.

The wheels are fixed to the axle by means of fixing elements, ensuring that, by rotating the axle, the wheels are rotated as well. Thus, the machine performs its displacement along the rails.

The displacement wheels comprise a wheel body and two ribs, each rib associated permanently with one of the lateral ends of the wheel body. The radial face of the wheel body is configured to be kept in contact with the upper surface of the rails, while the lateral ribs are configured to keep the wheel aligned, with one of its side faces always in contact with the side face of the rails.

When performing the displacement movement, the wheels are under constant friction due to their direct contact with the rails, causing its wearing and the need for regular maintenance. The maintenance basically consists of exchanges and repairs of wheelset wheels, and the wheel rib is the most worn out element during movement of the machine.

Such a wheel, in technique status, is made in a massive way, so that the wheel rib and the body are integrally formed into a single piece of metal. Therefore, when the rib is worn out, it is necessary to change the entire wheel. This complete exchange of wheel is a waste material, since, as mentioned above, the wearing occurs more often only in the ribs.

Furthermore, in technique status, to perform this maintenance it is necessary to remove all of the wheelset of the displacement system, thus requiring great effort for operators and long run of this operation.

Thus, the technique status does not have a wheel which allows rapid maintenance without removal of the displacement system wheelset. However, the technique status does not have a wheel which allows to change only the rib, avoiding the waste of its full disposal.

SUMMARY

This disclosure relates to a wheel of displacement system which allows rapid and practical maintenance without removal of the wheelset.

This disclosure also relates to an economic displacement system wheel that avoids the full disposal of the wheel after a while of using this element.

BRIEF DESCRIPTION OF DRAWINGS

This disclosure is described in detail, based on the respective figures.

DETAILED DESCRIPTION

Figure 1:
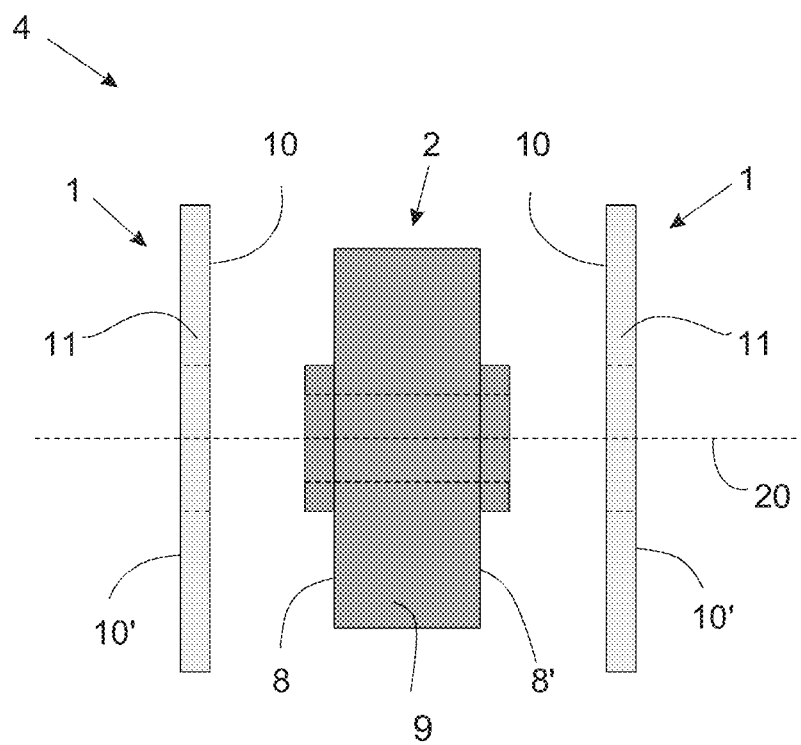
FIG. 1—side view of the wheel in exploded layout.
Figure 2:
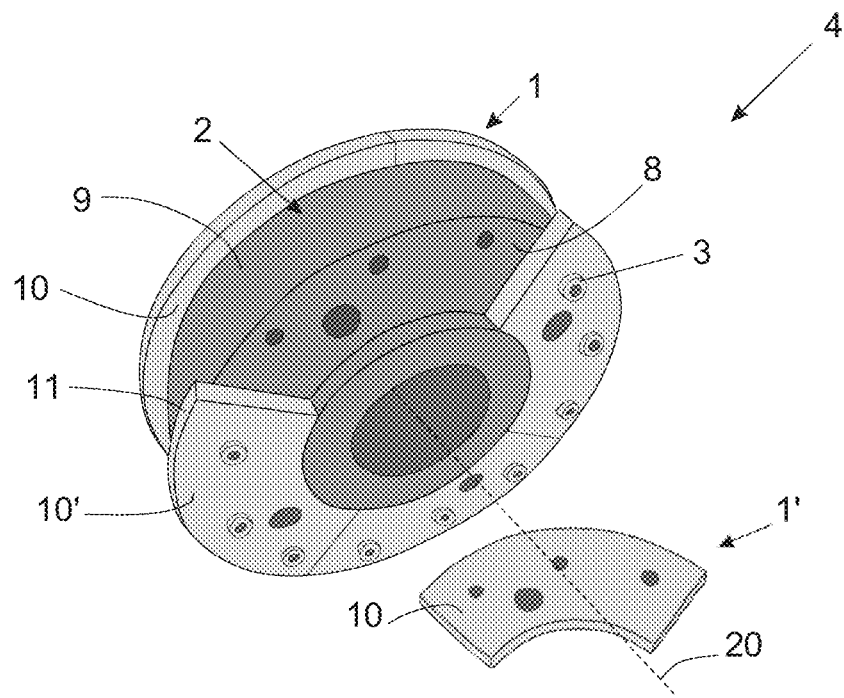
FIG. 2—perspective view of the wheel with their respective ribs and wheel body.

This disclosure comprises a wheel 4 for a displacement truck 7 of port machinery and equipment which move on rails 13. Such wheel 4 comprises a wheel body 2 and a set of ribs 1, being both concentric elements to a central axis of reference 20 (see FIGS. 1 and 2). Wheel 4 and its elements are described in details below.

The wheel body 2 has a circular shape, having two longitudinal faces 8 and 8', and a circumferential radial face 9. The circumferential face 9 of the wheel body 2 is set to remain in contact with the upper face of rails 13.

The longitudinal faces 8 of 8' of the wheel body 2 are provided with a through hole in its center, which is configured to couple with the axle 5 when the wheel 4 is mounted on the wheelset 18. Such longitudinal faces 8 of 8' also have many holes, set to ensure the associations of ribs 1 to the wheel body 2 through bolts.

The ribs 1 also have a circular shape, being configured to be concentric and fixed in parallel to the wheel body 2. Each of the ribs 1 has an outer radius larger than the outer radius of the wheel body 2.

This radius must necessarily be larger so that the portion of the longitudinal faces 10 of the ribs 1, which protrudes to the wheel body 2, is in contact with the side face of the rails 13, ensuring, therefore, the wheel 4 alignment and guidance under rail 13.

The longitudinal faces 10 and 10' of the ribs are also provided with a through central bore, which is a concentric hole to the center hole of the wheel body 2, and provided with a larger radius than the radius of the bore in the wheel body 2. Such longitudinal faces 10 and 10' also comprise through holes configured for the passage of bolts 3 used for its fixing to the wheel body 2. The ribs also include a radial face (11).

This fixing is performed as follows: the longitudinal faces 10 of each of the ribs is configured to be laid in contact the longitudinal faces 8 and 8' of the wheel body 2, respectively, so that the ribs become fixed concentrically and in parallel to the wheel body 2.

The bolts 3 pass through holes arranged on the longitudinal sides 10 and 10' of the ribs and are threaded in holes arranged on the longitudinal sides 8 and 8' of the wheel body 2, so that the bolt 3 heads come into contact with the longitudinal side of 10' of the ribs 1, being this the opposite to longitudinal side of 10' of the ribs 1.

Figure 3:
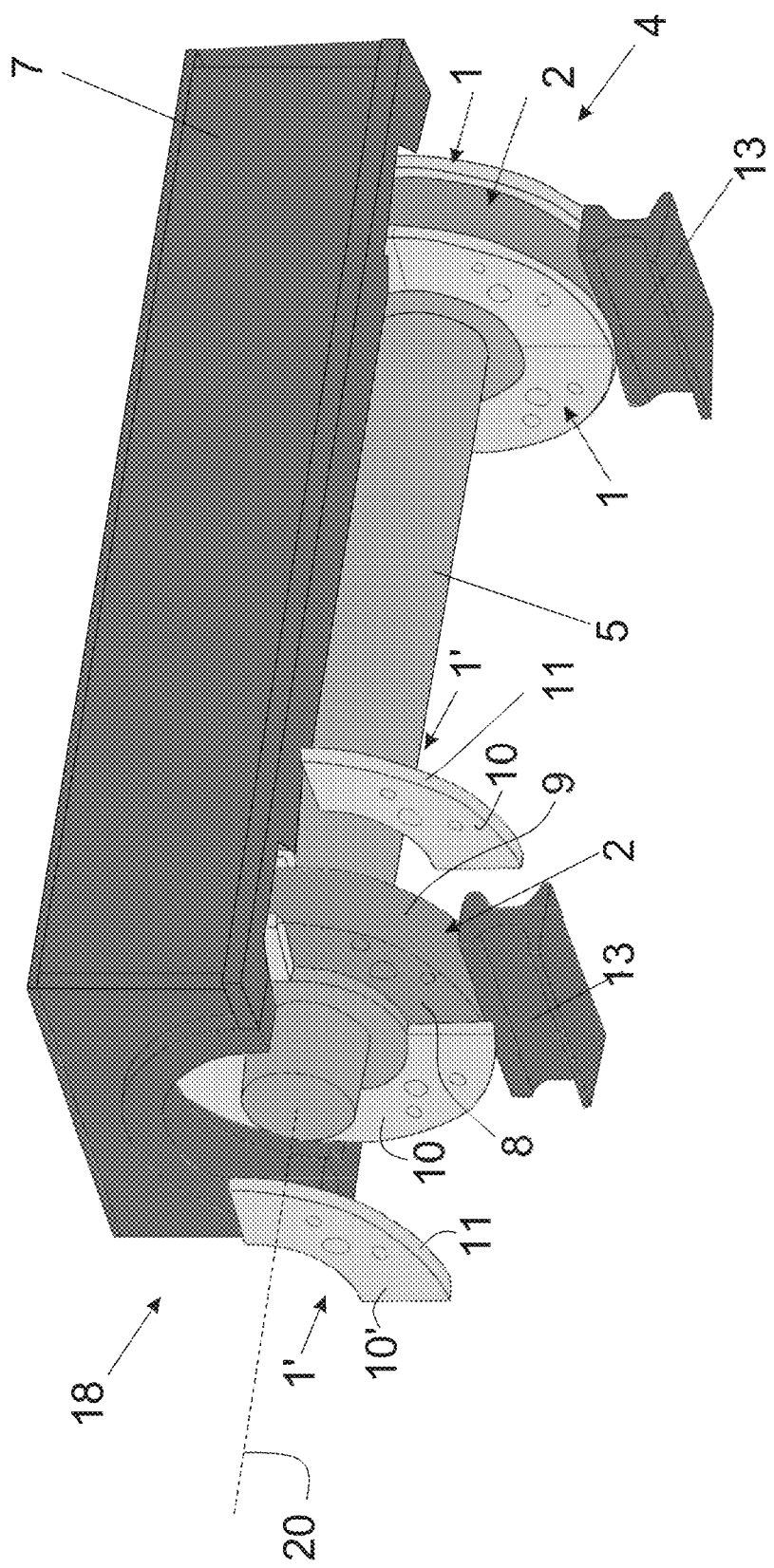
FIG. 3—perspective view of a full truck associated with a pair of rails.

The ribs 1 of the wheel 4 of this disclosure is segmented into at least two parts of 1', so that the joining the parts of 1' gives shape the ribs 1 described above (in the example shown in FIGS. 2 and 3, it is shown a rib 1 segmented into four distinct portions). Such segmentation is configured so that the rib 1 can be removed and replaced even while the wheel 4 is mounted on the wheelset 18, thereby preventing removal of the wheelset 18 of the displacement truck 7, see FIG. 3.

The rib 1 is preferably made up of four equal pieces of 1' so that each part of 1' has a tiny size and a weight that allows easy handling of this element for the maintenance of wheelsets 18.

Thus, the use of the wheel 4 for displacement truck 7 ensures a quicker maintenance, since it is not necessary to remove the wheelset 18 to perform the exchange of the ribs 1. In addition, wheel 4 ensures an economy the maintenance process of this equipment, since it is possible to carry out the exchange of the rib 1 only, with no need for total disposal of wheel 4 when only the rib 1 is damaged.

The economy is also given due to a shorter machine downtime during maintenance, because as the ribs 1 are segmented in 1' parts, it is not necessary to perform the removal of the wheelset 18 for replacement of the ribs 1.

Finally, it is concluded that the disclosure addresses one or more of the described aspects, revealing a wheel 4 of displacement truck 7 with a quick, practical and economical maintenance.

Having described some examples of aspects of the present disclosure, it is noteworthy that the scope of protection given by this document encompasses all other alternative forms appropriate to the execution of this disclosure, which is defined and limited only by the content of the claim scope attached.

The invention claimed is:

1. A wheel for a displacement truck, comprising:
a wheel body having opposing longitudinal body faces and a circumferential face; and
removable ribs each comprising opposing longitudinal rib faces and one radial face;
wherein the wheel body and each of the ribs are arranged concentrically to a central axis of reference and define a central through hole in a center of the longitudinal body faces and the longitudinal rib faces, respectively;
wherein each of the ribs have a circular profile with an outer radius larger than an outer radius of the wheel body and wherein a portion of each of the ribs is sized so that the portion protrudes from the wheel body and is configured to contact a side face of a rail;
wherein each of the ribs are fixed substantially in parallel to the wheel body so that one of the longitudinal rib faces of each of the ribs is at least partially in contact with a corresponding one of the longitudinal body sides;
wherein each of the ribs is segmented into at least two different parts;
wherein the central through hole defined by the wheel body is sized to couple with an axle of a wheelset of the displacement truck;
wherein at least one of the ribs is removable from the wheel body when the wheel body is mounted on the axle of the wheelset: and
wherein the ribs are planar.

2. The wheel according to claim 1, wherein each rib is segmented into four different parts.

3. The wheel according to claim 2, wherein the four different parts are substantially equally sized.

4. The wheel according to claim 1, wherein the at least two different parts of each of the ribs are positioned concentrically.

5. The wheel according to claim 1, wherein the ribs are positioned in respective planes substantially parallel to a plane of the wheel body.

6. The wheel according to claim 1, wherein each of the opposing longitudinal body faces define a plurality of body holes, wherein each of the at least two different parts of each of the ribs define at least one rib through hole alignable with at least one of the plurality of body holes, and further comprising a plurality of fasteners each having a body sized to fit through a respective rib through hole and further configured to removably engage one of the plurality of body holes so that a head of each fastener is removably contactable with a corresponding longitudinal rib side.

7. A wheelset for a displacement truck comprising the wheel of claim 1.

8. A displacement truck comprising a wheelset having an axle and the wheel of claim 1 mounted on the axle.

9. The wheel according to claim 1, wherein each of the ribs is segmented along an entire length of the outer radius of the ribs.

10. The wheel according to claim 1, wherein each of the ribs is segmented entirely across a body of each rib at least two radial locations relative to the central axis.

* * * * *